H. R. SUMMERHAYES.
REMOTE CONTROL OF DYNAMO ELECTRIC MACHINES.
APPLICATION FILED APR. 29, 1914.
1,173,058.   Patented Feb. 22, 1916.
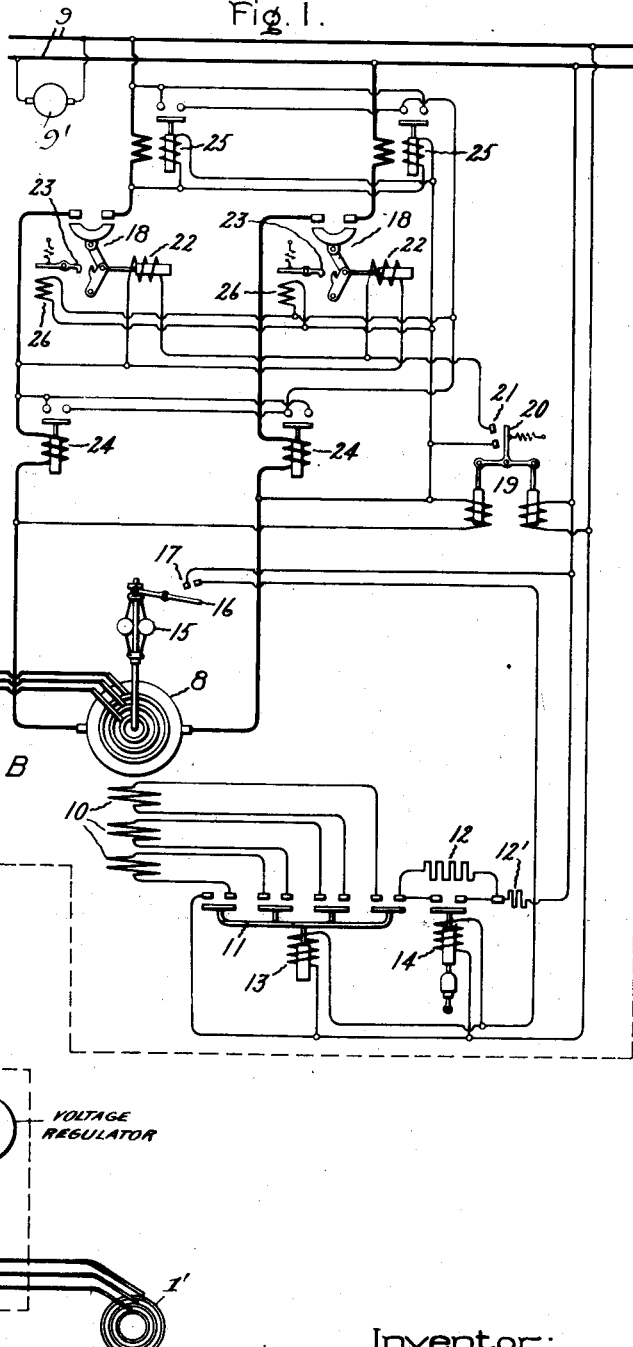
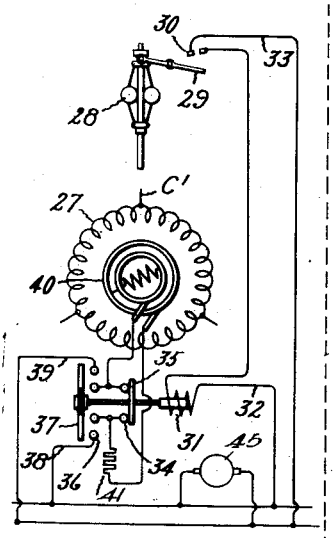
Witnesses:
Inventor:
Henry R. Summerhayes,
by
His Attorney.

UNITED STATES PATENT OFFICE.

HENRY R. SUMMERHAYES, OF SCHENECTADY, NEW YORK, ASSIGNOR TO GENERAL ELECTRIC COMPANY, A CORPORATION OF NEW YORK.

REMOTE CONTROL OF DYNAMO-ELECTRIC MACHINES.

1,173,058. Specification of Letters Patent. Patented Feb. 22, 1916.

Application filed April 29, 1914. Serial No. 835,127.

*To all whom it may concern:*

Be it known that I, HENRY R. SUMMERHAYES, a citizen of the United States, residing at Schenectady, county of Schenectady, State of New York, have invented certain new and useful Improvements in Remote Control of Dynamo-Electric Machines, of which the following is a specification.

My invention relates to the remote control of dynamo electric machines, and more particularly of synchronous dynamo electric machines, and has for its object an improved form of control whereby such machines may be started and controlled by an operator who may be at some distance from the machines and without requiring the constant presence of an attendant in the building in which the machine or machines are installed.

I am aware that the remote control of dynamo electric machines has been proposed, one of which systems of control is shown in United States Patent 792,105, J. E. Woodbridge and J. B. Taylor, remote control of dynamo electric machines, June 13, 1905. My invention aims to be an improvement on such systems.

I accomplish the object of my invention by a special arrangement and connections of the apparatus which I employ.

The novel features of my invention are pointed out with particularity in the claims appended to and made a part of this specification.

For a further understanding of my invention, reference may be had to the accompanying drawing, in which—

Figure 1 shows diagrammatically a preferred embodiment of my invention and Fig. 2 shows a modification thereof.

Referring first to Fig. 1, the main power station or main sub-station is represented in the lower left hand corner of the figure by the rectangle A of dotted lines. In this station, as I shall describe more in detail later on, are situated the source of electrical supply and various controlling devices for the remote control of a dynamo electric machine, or machines. In the upper right hand portion of the figure and within the dotted lines representing a substation, B, is shown the machine to be controlled and the auxiliary apparatus therefor situated in the same.

Connecting the main station or the main substation A and the substation B in which is the machine to be controlled are conductors C transmitting electrical energy from the one to the other. It will be noted that these conductors, which are here shown as conductors for a three-phase system, are the only conductors extending from the main station to the substation. Inasmuch as such conductors are necessary for the transmission of electrical energy from the source to the dynamo electrical machine to be controlled, it will be seen that by my invention I am able to effect the remote control of such a machine without the addition of any additional conductors passing between the main station and the sub-station. Thus the complication of additional control wires passing between the main station and the substation is avoided and the simplest form of connections possible may be employed in connecting the main station with the substation. It will be obvious, of course, that a duplicate set of energy conductors may be used between the main station and the substation to serve as an emergency circuit in case one circuit should be damaged and that if desired a telephone system may be installed between the main and substations. Inasmuch, however, as such additional conductors do not form a part of my invention, I have not illustrated them and they are not necessary in any way for the carrying out of my invention.

In the main station or main substation A are shown conductors 1 connected to a suitable source of three-phase alternating current supply 1′. Connected to these conductors is a double throw switch 2 making contact with a double set of contacts 3 so arranged that when the switch is thrown in one position the conductors 1 are connected to a suitable auto-transformer or starting compensator 4, or other similar device, and in the other position, that is, when the switch is thrown to the right, to a voltage regulator 5. The voltage regulator 5 may be of the induction or other suitable type. As will be seen from an inspection of the drawing, these devices are connected to conductors C and are so arranged as to change the voltage impressed by conductors 1 upon conductors C.

It will be understood that the voltage controlling and regulating devices 4 and 5 may be of any known and desirable form, and inasmuch as they do not form a part of my invention for clearness of illustration and description, I have not specifically illustrated or described them. For the same reasons I have not shown the usual meters, switches, etc., which it is customary to employ in stations of this character, but it will be understood that such may be used in the customary manner. Conductors C connect the main station A and the substation B, and, as I have said above, are the only conductors which it is necessary to employ for connecting the machine to be controlled with the source of electric energy.

In the substation B and connected to conductors C is shown a switch 6 which normally is closed. Transformers 7 are employed for reducing the voltage at which the electrical energy is carried to the substation, to a voltage suitable for the operation of the machine or machines to be controlled, in this case a synchronous dynamo electric machine 8, here shown as a three-phase synchronous converter or rotary transformer. It will be obvious that while I have shown a three-phase machine, a machine of any desired number of phases may be employed.

At the top of the figure are shown conductors 9 which are connected to and form a part of a direct current system to which the synchronous converter furnishes energy and which is also continuously connected to other sources of direct current, such as the generator 9'.

The field windings of the synchronous converter are shown at 10 as normally divided up into disconnected portions and unenergized when the converter is not in operation. It will be obvious that the portions are disconnected in order to reduce the induced voltage in the field windings when the converter is being started. Interconnecting these portions is a switch 11 which connects the windings in series with resistance 12 and resistance 12', and also connects them to conductors 9, so that they are energized from the direct current system. This switch is controlled by means of a relay 13. A time limit relay 14 is arranged to short-circuit the resistance 12 after the lapse of a time interval from the closing of switch 11. Resistance 12' is shown as connected in series with the field windings, and it will be understood that this may be a regulable resistance of the usual kind. Operated by the converter is shown a centrifugal device 15 actuating a contact arm 16 which closes the contacts 17 after the converter has attained a certain speed. By tracing the connections, it will be seen that when contacts 17 are connected, the relay 13 and the time limit relay 14 are energized from the direct current system.

The direct current side of the converter or rotary transformer is connected to the direct current system by means of circuit breakers 18. The closing of these circuit breakers is effected by means of the differential relay 19, which may be of any suitable construction. When the voltage of the converter is greater by a predetermined amount than the voltage between the conductors 9, or, in general, than the voltage of the direct current system at the locality to which the converter is to supply energy to the system, the differential relay will operate to throw arm 20 to the left against the action of a spring and connect contacts 21. When contacts 21 are connected, the closing coils 22 of the circuit breakers are energized, the circuit breakers are closed and latched in this position by latches 23 and the direct current side of the converter is connected to the direct current system.

Connected to the conductors connecting the direct current side of the converter to the direct current system are shown overload relays 24 and reverse current relays 25, both of which operate in the usual manner to energize trip coils 26, thus releasing the latches of the circuit breakers and causing the same to open in case of an overload upon the converter or a reversal of current caused by the dropping of the direct current voltage of the converter.

While I have illustrated the overload and reverse current relays as separate pieces of apparatus and operating as relays, these may operate directly upon the circuit breakers and in fact may actually be built as single units with them. It will also be obvious that, if desired, only one circuit breaker may be employed instead of two and the overload and reverse current devices operating the same be changed accordingly in any well known manner. The usual meters may also, if desired, be installed in the substation and also the usual disconnecting switches. I have not illustrated these, however, inasmuch as they form no portion of my invention and in order to avoid complication in the illustration and the description of the same, and it will be obvious that in a system such as that which forms my invention, there will not be the same necessity for these devices, as there is in a system requiring the constant presence of an attendant or attendants in the substation.

In Fig. 2 I have shown diagrammatically a modification of my invention, this modification consisting in the remote starting and control of a synchronous electric motor. A three-phase synchronous electric motor is shown diagrammatically at 27, the conductors C' being connected to the armature thereof, and it will be understood that these conductors may be connected either directly or in series with transformers to the conductors connecting the substation in which the synchronous motor is and the main station supplying electric energy thereto in the same manner that the synchronous converter in the substation B is shown connected to the main station A in Fig. 1.

Operated by the synchronous motor is shown a centrifugal governing device 28 actuating a contact arm 29, which closes contacts 30 after the motor has attained a certain speed. Connected in series with these conductors is a relay 31. The winding of this relay is connected to conductor 32 and one of the contacts 30 to conductor 33, these being connected to a direct current source of supply 45, in such a fashion that when contacts 30 are connected, the winding of relay 31 will be energized from the direct current source of supply in the usual manner.

In operative relation with relay 31 are contacts 34, which may be connected by a conducting member 35, and contacts 36, which may be connected by conducting member 37. These members are moved by the relay. One of contacts 36 is connected to conductor 38 and a second contact of contacts 36 is connected to conductor 39, these conductors being connected to a direct current source of supply, such as the generator 45. The field of the synchronous motor is shown diagrammatically at 40 and connected in series with the field and to contacts 34 and 36 is shown a resistance 41.

The method of operation of my invention is as follows: Referring first to Fig. 1, when the synchronous converter is not running, the switch 6 in the substation B will normally be closed and switch 2 in the main station open. When it is desired to start the converter, the regulator 5 is moved to the position giving the lowest voltage and the auto-transformer or starting device 4 to its starting position. The switch 2 is then moved to the left, making contact with one side of contacts 3, including the starting device 4 in the circuit. As there are no switches between the main station and the substation in which the converter is placed and the switch 6 is closed, an alternating current voltage less than the normal running voltage will be impressed upon the converter and the latter will start in the usual manner coming up nearly to synchronism without the field being energized.

The centrifugal device 15 is arranged to operate in such a manner that when the converter reaches a speed near synchronism, the device will operate to connect contacts 17 through the action of arm 16 and thus interconnect and energize the portions of the field winding of the converter and thus cause it to lock into synchronism. Since the resistances 12 and 12' are connected in series with the field windings, the converter will be energized with a comparatively weak field and will lock into synchronism with a weak field and thus the excessive rush of current which would occur in case the converter were locked into synchronism with a full field will be largely prevented and its effects minimized. Also since the field of the converter is energized from the direct current system, which will always be of the same polarity, the converter will always lock into synchronism with the proper polarity.

The time limit relay 14 will operate at a definite time interval after the operation of the relay 13, thus short-circuiting resistance 12 and throwing practically the full field on the converter. It will be seen from an inspection of the figure that resistance 12' will still be connected in series with the field of the converter, and this may be, if desired, a regulable resistance. When full field is thrown upon the converter, the amount of alternating current supplied to the same will be considerably increased momentarily and will then fall to a low, steady value, and this increase and decrease will be indicated by suitable ammeters, not shown, in the main station. Upon observing this change in current, the operator will operate the starting device 4, increasing the alternating voltage impressed upon the converter. The switch 3 may then be thrown to the right so as to disconnect the starting device and connect the regulating device 5 in series with the converter, so that the converter will now be operating with a voltage somewhat below its normal running voltage.

After connecting the regulator 5 into the circuit, the operator will then gradually increase the alternating current voltage impressed upon the converter by properly operating the regulating device and thus gradually increase the direct current voltage supplied by the converter. When this direct current voltage exceeds that of the direct current system by the predetermined amount for which the differential relay 19 is adjusted, this relay will operate to connect contacts 21 and thus close the circuit breakers 18, connecting the direct current side of the converter to the direct current system. When the circuit breakers are closed, they will be latched into the closed position by latches 23. It will be obvious that some form of latching device will be necessary because when the circuit breakers are closed, the differential relay 19 will open, and closing coils 22 of the circuit breakers will be deenergized since there will be substantially no difference between the voltages across the direct current side of the converter and the conductors 9, and hence there will be no resultant force to keep the differential relay closed.

When the circuit breakers are closed, the converter will then take its load or supply energy to the direct current system and the amount of this load may be regulated from the main station by means of the regulating device and through observing the readings of the proper meters in the main station. When it is desired to shut down the converter, the operator at the main station will open the main switch 2, thus disconnecting the converter from the alternating current source of supply. The reverse current relays 25 will then operate to open the circuit-breakers 18, disconnecting the direct current side of the converter from the direct current system. As the speed of the converter decreases, the centrifugal device 15 will disconnect the contact 17, thus causing the switches short-circuiting the resistance 12 and connecting the fields of the converter to the direct current system to open. The converter will then be in a position to be restarted whenever it may be so desired.

The method of operation of my invention, as shown in the modification illustrated in Fig. 2, as applied to a synchronous electric motor is substantially the same as that which I have described as applied to a synchronous converter, the principal difference being that in the modification, as shown in this figure, the motor is started with the field short-circuited through a resistance. This short-circuiting of the field is not essential and the open circuit method of starting may be used as well for a motor as for a synchronous converter. An additional difference also exists from the fact that for the control of a synchronous converter, apparatus must be provided for connecting the same automatically to the direct current system to which it is to supply energy. With a synchronous motor, no necessity exists for the provision of such apparatus unless the motor drives a direct current generator.

Referring now to Fig. 2, when starting the motor the operator in the main station, not shown, will impress an alternating current voltage upon the motor in the same manner as that which has been described with reference to the synchronous converter shown in Fig. 1. It will be seen from an inspection of Fig. 2 that the field of the motor is unenergized and is short-circuited through resistance 41 by means of contacts 34 and contact member 35. The centrifugal device 28 operated by the motor is so arranged that when the motor attains a speed nearly that of synchronism, it will operate to close contacts 30 by means of arm 29 and thus energize the winding of relay 31 and move contact members 35 and 37 which are in operative relation with the relay toward the right.

Such motion will disconnect contacts 34, breaking the short-circuit of the field of the motor, and connect it to a direct current source of supply, such as the generator 45, by means of conductors 38 and 39. The field of the motor will then be energized in a manner similar to that described with reference to Fig. 1 and the armature of the motor will lock into synchronism.

It will be obvious that while I have described a preferred embodiment of my invention, with a modification thereof, other forms and modifications will suggest themselves, and that these may be employed without altering the spirit of my invention, and, therefore, I do not seek to limit myself to the exact connections or apparatus which I have illustrated or described but in the appended claims seek to cover such connections and forms of apparatus as will be obvious to those skilled in the art and will not depart from the spirit of my invention.

What I claim as new and desire to secure by Letters Patent of the United States, is:—

1. In combination, a synchronous converter, field windings therefor normally disconnected, an alternating current source of supply, a direct current system, means for starting said converter from the alternating current source, a relay for connecting the field windings to the system, and resistance in series with them, a time limit relay for short-circuiting said resistance, means dependent upon the speed of the converter for energizing said relays, and means for connecting the direct current side of the converter to the system.

2. In combination, a synchronous converter, field windings therefor normally disconnected, an alternating current source of supply, a direct current system, means for starting said converter from the alternating current source, a relay for connecting the field windings to the system, and resistance in series with them, a time limit relay for short-circuiting said resistance, means dependent upon the speed of the converter for energizing said relays, means for connecting the direct side of the converter to the system, and a differential relay in operative relation with said means.

In witness whereof, I have hereunto set my hand this 28th day of April, 1914.

HENRY R. SUMMERHAYES.

Witnesses:
HELEN ORFORD,
HEWLETT SCUDDER, Jr.